(No Model.)

D. McC. DITTO.
ATTACHMENT FOR CULTIVATORS.

No. 365,056. Patented June 21, 1887.

Witnesses
W E Bowen
E M Carnana

Inventor:
David McC Ditto
W D Campbell
atty

UNITED STATES PATENT OFFICE.

DAVID McC. DITTO, OF AMANDA, OHIO.

ATTACHMENT FOR CULTIVATORS.

SPECIFICATION forming part of Letters Patent No. 365,056, dated June 21, 1887.

Application filed October 13, 1886. Serial No. 216,188. (No model.)

*To all whom it may concern:*

Be it known that I, DAVID McC. DITTO, a citizen of the United States, and a resident of Amanda township, in the county of Allen and State of Ohio, have invented a new and useful Attachment for Cultivators, of which the following is a specification.

My invention relates to an adjustable harrow or harrow attachment adapted to fit onto the arm or shank that usually carries the shovels on a cultivator to thoroughly work the ground between the rows of corn and to make it possible to work the ground close to the young corn without covering and smothering it, as is done so often in the usual way of working.

Figure 1:
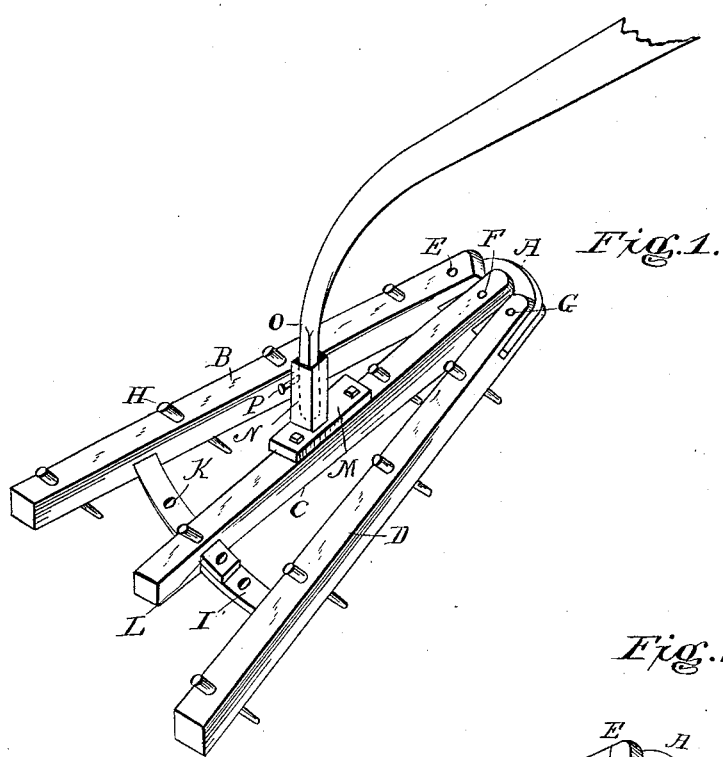
Figure 2:
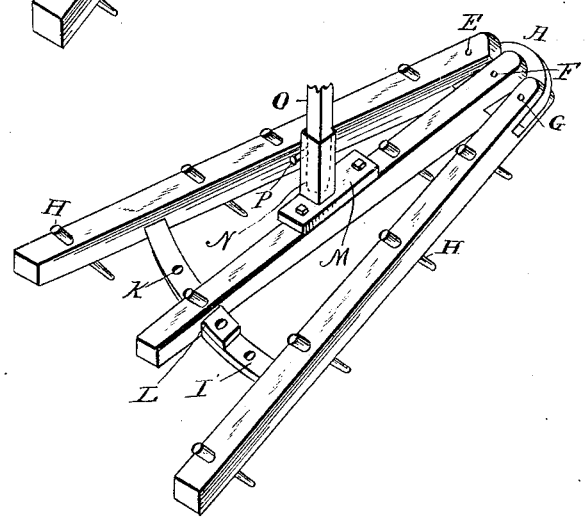

Figures 1 and 2 are perspective views of the harrow attached to sections of the drag-bars.

A is the head-block; B C D, the pivoted beams on the block, and carrying teeth H, slightly inclined forward; E F G, pivots by which the beams are attached to the head-block; H, teeth; I I', slides attached to beams B D, that play through a slot in beam C; K, holes in slides I I'; L, pin passing through hole in beam C and slides I I'; M, a plate attached to the center beam, C, and having mounted thereon sleeve N, with a square mortise therein, in which the drag bar of the cultivator fits rigidly.

O is the drag-bar of the cultivator; P, set-screw to hold the sleeve N on drag-bar O.

The object of my invention is to provide a convenient harrow that can be readily attached to the drag-bar of a cultivator after the shovels have been detached, and work the ground in a different manner and more effectually than can be done with the present system of shovels.

The beams B C D each have a series of teeth, H, located along their lengths, and are pivoted to the block A, as shown. The rear ends are adjustable to and from each other by means of the slides I I' shown and pin L, that fits in holes K. All the shovels can be taken off the cultivator and four of these harrows substituted; or, as I often prefer, the harrows can be substituted for the two inside shovels and the outside shovels left as usual.

The object of having the beams B C D separately adjustable toward each other is that when I desire to work close to a corn-row I remove the pin L and slide the beam B or D, as the case may be, close to the center beam and insert the pin in the next hole, or such hole as desired. In this manner the beam next to the corn-row may be thrown parallel with the row. I prefer to throw it at a slight angle, so that when the rear tooth of the beam next to the corn is close to the corn the front tooth will be some six or eight inches farther away, and the intervening teeth cutting at regular distances between, thus cutting or stirring the ground next to the row in the succeeding steps closer and closer to the corn in such small slices that it will be thoroughly worked without being turned over onto the young corn. The middle beam also cutting close to the row gives a thorough cultivation close to the corn, while the shovels cultivate between the rows; or all the shovels can be taken off and the harrows put on all the shanks.

What I claim is—

The combination, with the beam C attached rigidly to the drag-bar of a cultivator, of the independently-adjustable beams B D, as and for the purposes set forth.

DAVID McC. DITTO.

Witnesses:
 W. A. CAMPBELL,
 J. E. DIXON.